US006015230A

United States Patent [19]

Wantz et al.

[11] Patent Number: 6,015,230

[45] Date of Patent: *Jan. 18, 2000

[54] METHOD AND APPARATUS FOR TESTING HEAT DETECTORS

[75] Inventors: James C. Wantz, Mesa, Ariz.; Leon Cooper, 29706 Baden Pl., Malibu, Calif. 90265

[73] Assignee: Leon Cooper, Malibu, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/942,007

[22] Filed: Oct. 1, 1997

[51] Int. Cl.[7] ............................ G08B 29/00; G01K 15/00

[52] U.S. Cl. ................................................ 374/1; 340/515

[58] Field of Search ................................ 374/1; 340/514, 340/515; 126/263.05, 263.06, 263.07, 263.02; 44/251, 252, 253

[56] References Cited

U.S. PATENT DOCUMENTS

| | | | |
|---|---|---|---|
| 4,017,414 | 4/1977 | Black et al. | 252/188.25 |
| 4,518,952 | 5/1985 | Tanaka et al. | 340/515 |
| 4,522,190 | 6/1985 | Kuhn et al. | 126/263.02 |
| 4,649,895 | 3/1987 | Yasuki et al. | 252/67 |
| 4,827,244 | 5/1989 | Bellavia et al. | 340/515 |
| 4,859,075 | 8/1989 | Sutter, Jr. et al. | 340/515 |
| 5,117,809 | 6/1992 | Scaringe et al. | 126/263.07 |
| 5,170,148 | 12/1992 | Duggan et al. | 340/515 |
| 5,443,056 | 8/1995 | Smith et al. | 126/263.05 |
| 5,611,329 | 3/1997 | Lamensdorf | 126/263.05 |
| 5,611,620 | 3/1997 | Wantz | 374/1 |

*Primary Examiner*—Andrew Hirshfeld
*Attorney, Agent, or Firm*—Natan Epstein; Beehler & Pavitt

[57] ABSTRACT

A method and kit of parts for testing heat detectors mounted at an elevated location above a ground surface using a supercorrosive metal alloy composition formulated to react exothermically but non-flammably upon being wetted for sustaining temperatures of about 195 degrees Fahrenheit, permitting testing of heat detectors rated at 175 to 195 degrees F. The composition is formed into convenient wafers which are elevated on an extension pole into proximity to the heat detector by an operator standing on the ground. The wafers may be activated by wetting with a disposable plastic syringe, and may be reheated several times.

13 Claims, 3 Drawing Sheets

METHOD AND APPARATUS FOR TESTING HEAT DETECTORS

BACKGROUND OF THE INVENTION

1. Field of the Invention

This invention generally pertains to the field of fire alarms and detectors and more particularly concerns a method and apparatus for conveniently testing the operation of heat detector alarm installations.

2. Background of the Invention

Early warning of fire in residential and commercial buildings has been proven to save numerous lives every year and has become a matter of national concern. For this purpose several different types of fire alarm systems are in use, designed to meet the requirements of various kinds of installations. Residential installations typically rely upon smoke detectors, which respond to the presence of air borne smoke particles generated in the early stages of combustion. However, smoke detectors can be unreliable in some commercial and industrial environments due to the presence of other airborne materials, vapors and dusts produced in the normal course of commercial and industrial activity and which can falsely activate smoke detectors. Many commercial and industrial installations therefore depend in part upon heat detectors which are activated by certain changes in temperature indicative of a possible fire.

Most modern heat detectors incorporate either the rate of rise principle of operation or are of the rate compensated type. Each such type of detector is capable of sensing not simply the existence of an elevated temperature, but rather the rate of rise of the temperature of the air surrounding the detector so long as this rate exceeds preset limits. The temperature of air near a ceiling tends to rise rapidly in the event of a fire, and heat detectors incorporating the rate of rise or rate compensation feature are designed to respond to such rapid rise in temperature in order to discriminate against more gradual temperature increases unrelated to conflagrations. Rate compensated heat detectors, on the other hand, are a combination of fixed temperature and rate anticipation i.e., they activate an alarm simply upon reaching a given temperature during slow heat rise. During rapid heat rise, however, they are designed to account for the temperature lag between the detector temperature and air temperature. The temperature of the heat detector unit always lags behind the rising temperature of the surrounding air. This is because it takes a certain amount of time for heat transfer to occur from the ambient air to the heat sensor unit. The extent of this lag depends on how quickly the air temperature is rising, the lag being greater for a faster temperature rise of the air. Rate compensated heat detectors are constructed to compensate for this temperature lag, so as to trigger an alarm at a lower detector temperature if the temperature of the detector is rising rapidly, and trigger the alarm at a higher detector temperature if the rate of rise is slower.

Rate compensation detectors respond when the temperature of the air surrounding the device reaches a predetermined level, if the temperature rise is of a rate less than 5 degrees F./minute, and responds quickly thus minimizing temperature lag when the air temperature rise exceeds 5 degrees F./minute. A rate of rise detector, by contrast, responds when the detector temperature rises at a rate greater than 15 degrees F./minute but does not operate if the temperature rise is slower than 15 degrees F./minute. Most rate of rise heat detectors are combined with a fixed temperature feature. The fixed temperature portion of the combined rate of rise/fixed temperature heat detectors is sometimes activated by a fusible link made of a eutectic material, which can be a metallic alloy characterized by a low melting point. The eutectic alloy is selected to melt at the desired fixed temperature, and may be installed in such a way that an electrical circuit is closed when the fusible element melts. For example, a spring element can be held in a stretched condition so that upon melting of the eutectic element, the spring is released into contact with a second element to make an electrical connection. Eutectic alloy sensors are one shot devices, and must be replaced if once activated. Other models use a bi-metal arrangement which changes shape causing a contact closure at the desired temperature. Such detectors are self-restoring and so are reusable.

A more recent evolution in heat detection is the electronic heat detector. This detector utilizes a thermistor as a sensing element. As a thermistor is an electrical resistor made of a semiconductor whose resistance varies sharply in a known manner relative to changes in temperature it can be used in a variety of heat sensing applications.

Thermistor based heat detectors are electronic as compared to other heat detectors in the fire alarm industry as they are electro-mechanical. Since thermistor based heat detectors are electronic their function is controlled by the design of the electronics which drive and monitor them.

Some thermistor based heat detectors are simply fixed temperature in that when the thermistor reaches a set temperature its known resistance at this temperature creates the electrical change in the circuit which has been designated as the alarm threshold and so the control panel to which the detector is connected, and from which the detector receives its electrical power, signals an alarm.

Variations in the electronics which monitor the resistive change in this thermistor permit some detectors to be used in analog systems, i.e. an analog system continuously accepts the change, or lack of change, in the resistance of the thermistor and interprets this information as either normal or off-normal and reacts by signaling an alarm if the off-normal reading meets a designated threshold.

Thermistor based heat detectors can as well be rate-of-rise or rate-of-rise/fixed temperature simply by the electronics used in the circuit which powers and interprets the return signals from this type heat detector.

Because the thermistor is mechanically somewhat fragile, the heat and even combination heat/smoke detectors which incorporate a thermistor provide an open, lattice like shield over the thermistor for protection from physical damage. This shield isolates the thermistor from coming into contact with a solid heat source and further causes an insulative barrier of air some one eighth to one quarter of an inch between the thermistor and a solid heat source.

The heat source used in U.S. Pat. No. 5,611,620, issued to Wantz, on Mar. 18, 1997, did not provide enough heat to overcome the isolated position of the thermistor and did not cause the electronic, thermistor based heat detectors to be tested.

Because of the higher heat of the exothermic reaction of the composition formulated wafer put forward in this application, the thermistor based detectors can now be tested as well as the electro-mechanical types which were tested by the heat pad in U.S. Pat. No. 5,611,620. Further, the higher heat of the formulated wafer also extends the range of the testable heat detectors into the Intermediate range.

The various types of heat detectors are each available in several temperature ratings, designed to respond at different temperature ranges. The temperature classifications include the Low temperature range from 100 to 134 degrees Fahrenheit, the ordinary temperature range from 135 to 174 degrees Fahrenheit, the Intermediate range from 175 to 249 degrees, and several still higher temperature ranges. The great majority of heat detectors currently in use, however, fall within the Ordinary temperature range, i.e. they activate at about 135 degrees Fahrenheit.

Each heat detector has a radius of effective coverage. This radius varies from one heat detector model to another, and typically is between 25 feet and 50 feet. A typical installation requires a number of heat detectors installed in a grid pattern on the ceiling of the structure to be protected. The spacing between the detectors is determined by the effective coverage capability of each unit. A large commercial or industrial space, such as a warehouse, may have a considerable number of heat detectors. Furthermore, such spaces commonly have high ceilings, which places the heat detectors out of easy reach.

Prior to the invention disclosed in U.S. Pat. No. 5,611,620 issued to Wantz on Mar. 18, 1997, only makeshift methods existed for the operational testing of heat detectors, if such testing was done at all. Commonly employed heat sources included the use of hair dryers, heat guns and heat lamps. A ladder had to be placed under each heat detector and the heat source hand carried up the ladder to test the detector. Long extension cords were typically required by this approach. Such methods were cumbersome, time consuming and ineffective, with the result that too often heat detectors went untested over extended periods, in spite of annual testing requirements by industrial and commercial codes.

The U.S. Pat. No. 5,611,620 patent disclosed a method for testing heat detectors using heat packs containing a powdered iron composition formulated to react exothermically upon exposure to ambient air. Such heat packs are commercially available and are sold for use as personal body warmers in cold environments, and provide a convenient, inexpensive and safely disposable source of flameless heat for activating heat detectors. An extension handle equipped with a holder for the heat pack permits an operator standing on the ground or floor to reach heat detectors mounted high on a wall or ceiling without having to climb on ladders. In combination, the air activated exothermic composition and the extension device provide a considerable improvement over the then existing state of the art.

Nonetheless, the U.S. Pat. No. 5,611,620 patent recognizes a shortcoming inherent in the use of disposable heat packs based on air activated exothermic compositions, in that such heat packs generally develop sustained peak temperatures in the range of about 135 to 165 degrees Fahrenheit. This temperature range is quite suitable for triggering and testing heat detectors in the Low and Ordinary temperature classifications. It is, however, insufficient for testing electronic heat detectors and the regular heat detectors in the Intermediate and higher ranges, which trigger at temperatures of 175 degrees Fahrenheit and above. No satisfactory method for testing these electronic or higher temperature rated heat detectors is presently available.

A continuing need therefore exists for a safe, efficient and reliable method for testing heat detectors based on electronics or those having a temperature rating equal to or greater than about 175 degrees Fahrenheit.

SUMMARY OF THE INVENTION

This invention addresses the aforementioned need by providing an improved method for testing electronic and higher temperature rated heat detectors mounted at an elevated location above a ground surface. The novel method is practiced by providing a wafer of a composition formulated to react exothermically but non-flammably upon contact with water or a saline solution so as to sustain a temperature of the composition of at least 175 degrees Fahrenheit sufficient to activate the heat detector or detectors under test including heat detectors in the Intermediate temperature range, and to sustain such a temperature for a period of at least a few minutes following addition of an initial, relatively small amount of water or saline solution to the composition. The wafer is moistened by addition of a small measured quantity of water, such as a teaspoonful of water, in order to initiate the exothermic reaction, and the activated wafer is elevated into contact with or close proximity to each heat detector to be tested. Elevation of the package is preferably done with the aid of a substantially rigid extension having a handle end and a wafer holder at an opposite end. The heat generating wafer is placed in the holder, and the extension is raised to bring the holder with the wafer into contact with or close proximity to each heat detector by an operator standing on a ground surface under the heat detector. The wafer may be covered or enveloped by a tissue, paper or other porous, water absorbent material for better retention and more even distribution of the water over the surface of the wafer.

The composition of the wafer may include a metal mixture or alloy which is electrochemically reactive in the presence of an electrolyte such as a salt solution and generates heat as a byproduct of the reaction. Such metal alloys are also known as supercorroding alloys. In particular, it is contemplated that a combination of iron and magnesium may be used in the wafer in a porous matrix permeable to water. The matrix may be of a suitable polymeric material such as polyethylene, and sodium chloride may be included in the matrix so that electrolyte solution is formed by the addition of water. Powdered metallic alloy and powdered polymeric material can be formed by pressureless sintering into a porous solid which absorbs water when wetted and offers a large reactive surface area in its porous interior. The porous material is then cut into relatively thin wafers for use in the present invention. A method for making exothermic composition suitable for use in the method of this invention is described in U.S. Pat. No. 4,522,190 to Kuhn et al. and patents cited therein. Such compositions have been used in various heating pad applications, such as heating pads for underwater divers, and as a heat source for curing expoxied pipe joints, but most notably these materials have found widespread use as flameless ration heaters (FRH) in so called MRE (Meal Ready to Eat) military food rations.

Supercorroding alloys when activated by an electrolyte solution, such as a solution of ordinary salt (sodium chloride) in water, are capable of achieving sustained temperatures considerably more elevated than can be obtained with the air oxidized iron powders described in the Wantz '620 patent.

As is well known, the exothermic reaction of the supercorrosive metal alloy composition of this type results in release of steam. This has been noted, for example, in the Kuhn patent referred to earlier in the specification.

The heat sensing elements in some electronic type heat detectors are recessed inside an exterior shell or housing, which makes the sensors difficult to heat by means of heat packs, such as body warmer iron oxide packs, which rely on radiant heat or convection of ambient air. It is well known that air is a good heat insulator, and is used for such purpose in storm windows which include an air gap between two glass panes. An electronic sensor recessed in an exterior housing also presents an air gap which must be bridged in order to raise the temperature of the sensor sufficiently to actuate the alarm. The lower temperature air oxidized heat packs, such as disclosed in the Wantz U.S. Pat. No. 5,611,620 are not as effective as might be desired for activating heat detectors rated for higher temperatures or electronic heat detectors having recessed electronic sensors.

The release of steam by the reaction of the supercorroding metal alloy yields a marked improvement in the transfer of heat to the sensing element of a heat detector as compared to exothermic heat packs which rely only on radiation and convection of air for the transfer of heat. When the steam rises or expands into the housing of the adjacent heat detector under test the steam readily reaches into the housing, and because of the high caloric content of steam as compared to hot air, it more effectively heats the sensing element of the detector. The improved heat transfer enabled by release of steam enhances the testing of heat detectors of all types, both high and low temperature rated detectors, and expands the range of detectors which can be effectively tested.

Other advantages of the supercorroding alloys over air oxidized materials include considerably more rapid heating following wetting of the alloy, and the ability to control the rate of usage of a given alloy wafer according to the amount of water added, so that pulses of heat can be obtained by successive wettings of the same wafer rather than a single continuous oxidation reaction, thereby extending the usefulness of the alloy wafer or conversely, limiting the duration of the exothermic reaction in situations where only a brief application of heat is needed.

While the supercorroding alloys require the addition of water or an electrolite solution, the liquid can be conveniently added by means of a disposable plastic syringe which serves as both a carrying container and a dispensing and measuring device.

For purposes of the present invention the supercorroding alloy is formulated to sustain a temperature in the range of approximately 195 degrees Fahrenheit to about 205 degrees Fahrenheit or higher, for at least a few minutes upon contact with a small quantity of water, such as a teaspoonful, sufficient to moisten a substantial portion of the surface of the alloy wafer.

The wafer holder on the extension may be cup shaped with an open end defined by a cup wall, a cup bottom fixed to the extension, and a retainer for securing the wafer within the cup. The open end may be circular and the cup shape may have a frustro-cylindrical inner wall. The retainer can be dimensioned to make a friction fit in the cup in spaced relationship to the cup bottom so as to contain the heating wafer therebetween. A special holder attachment may be provided, designed to fit into the cup and to hold one or two alloy wafers facing upwardly from the extension at about a seventy degree angle. This orientation of the wafers facilitates application of a wafer flush against the body of standard heat detectors and to the grille over the thermistors in electronic detectors as well as facilitating the need to swivel the adapter to bring the wafer against the lightweight material, and can be made up of multiple sections, such as three foot long sections, of lightweight tubing separably joined together to make up a sufficient length to reach the ceiling mounted heat detectors.

The exothermic compositions used according to this invention readily are useful not only for testing all of the heat detector types tested with the air oxidizable compositions described in the Wantz et al. '620 patent, but extend the range of testable heat detectors to electronic and intermediate temperature rated detectors not testable with the previous compositions. This is accomplished with little loss of convenience and without sacrifice of safety or economy.

DETAILED DESCRIPTION OF THE PREFERRED EMBODIMENTS

Figure 1:
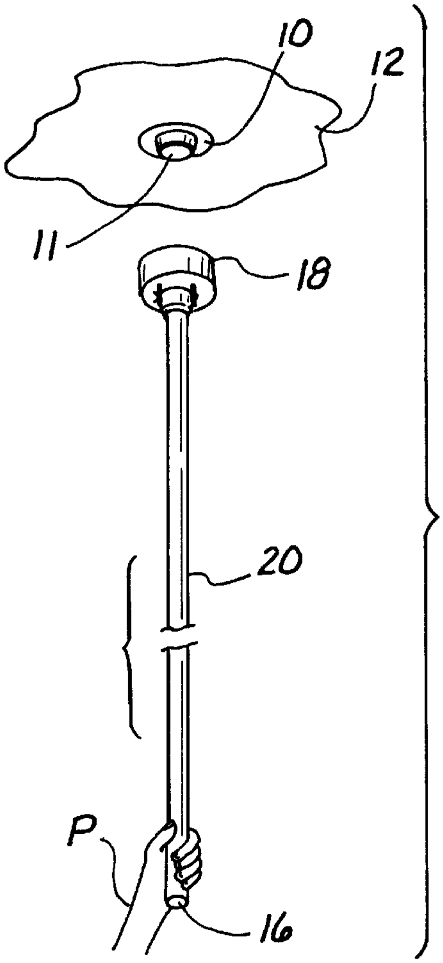
FIG. 1 illustrates the testing of a heat detector by lifting a heat emitting wafer in a cup holder on an extension pole into proximity to a ceiling mounted heat detector by an operator standing on a ground surface.
Figure 2:
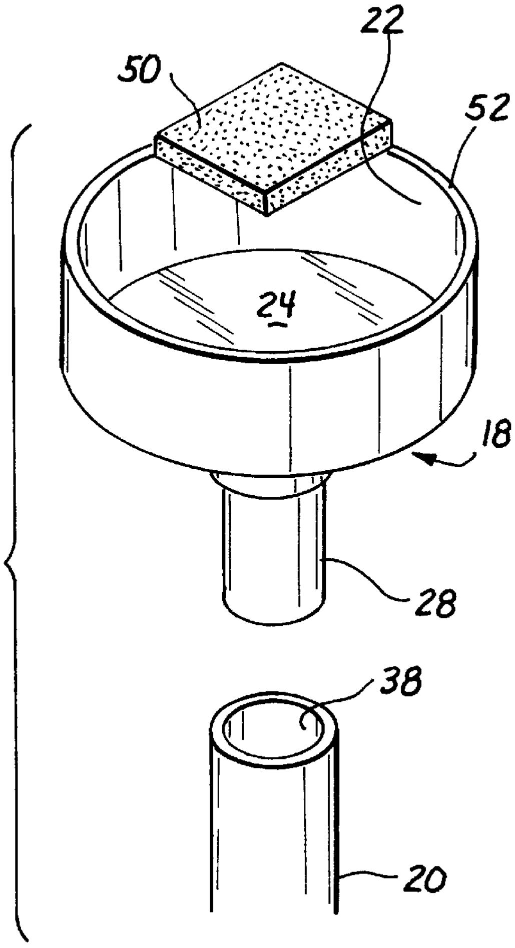
FIG. 2 is an exploded perspective view of the holder end of the extension pole.

With reference to the accompanying drawings, in which like numerals designate like elements, FIG. 1 shows a typical heat detector 10 mounted to a ceiling 12 above a floor or ground surface, not shown in the drawing. An operator P standing on the ground surface holds the handle end 16 of an extension pole 20. The opposite end of the extension has a holder 18, which is shown in greater detail in FIGS. 2 and 3. The extension 20, as better seen in FIG. 2, is a tube of a lightweight material such as poly vinyl chloride (PVC) plastic or aluminum. The holder 18 is cup shaped with a cylindrical or frustro-conical wall 22 and a cup bottom 24.

Figure 3:
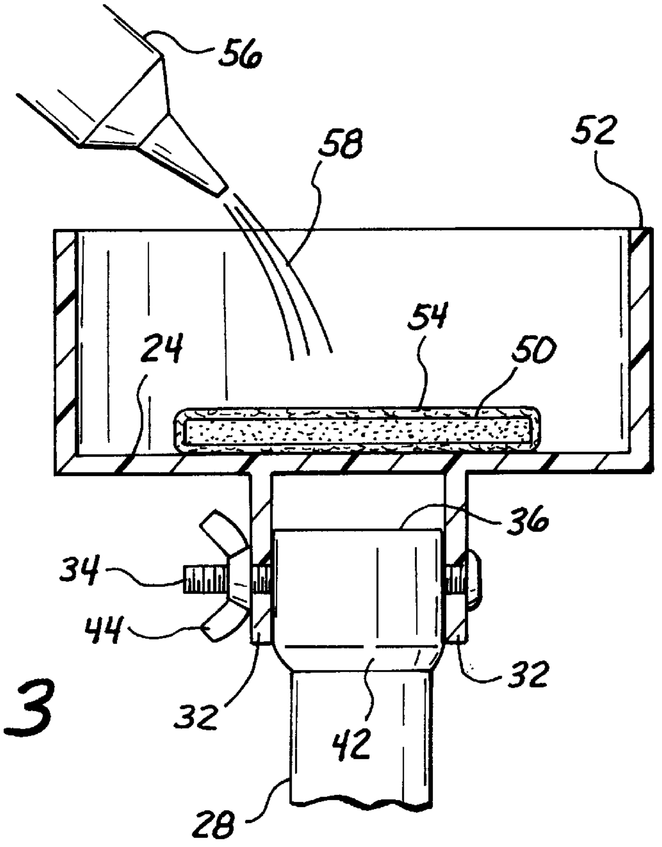
FIG. 3 is a sectional view showing a heat generating wafer in the holder end of the extension pole, the wafer being activated by wetting with water or saline solution dispensed from a syringe.

The cup 18 is swiveled to a mount 28, as better seen in FIG. 3. The swivel mounting includes a pair of ears 32 which extend from the underside of the cup 18, and cross bolt 34 which passes through aligned holes in the ears and the upper end 36 of the mount 28. The bottom portion of the mount 28 has a diameter sized to make a close sliding fit into the open end 38 of the extension pole 20. The upper portion 36 is of somewhat enlarged diameter so as to define an annular shoulder 42 which serves as a stop against the end of the extension pole 20 when the mount 28 is inserted into the end 38 of the pole. The two ears 32 are normally tightened against the mount 28 by means of a wing nut 44 on the bolt 34 to keep the cup from moving relative to the extension pole 20. The swivel permits the holder cup to be tilted relative to the extension pole for applying the cup 18 against a wall mounted rather than ceiling mounted heat detector.

A generally flat rectangular heat generating wafer 50 is made of a composition formulated to react exothermically upon being wetted with water. Generally, the preferred composition includes an active metal/passive metal alloy, such as a magnesium-iron alloy, and salt (sodium chloride) in a porous thermoplastic binder. Upon being wetted the salt dissolves and the salt solution in contact with the metal alloy initiates an exothermic reaction which generally involves the rapid corrosion of the magnesium metal into magnesium hydroxide accompanied by production of free hydrogen gas. The plastic binder may be polyethylene. A more detailed discussion of the formulation and manufacture of such exothermic compositions and of wafers containing the same is found in U.S Pat. No. 4,522,190 issued Jun. 11, 1985 to Kuhn et al.

The exact size, shape and proportions of the wafer 50 are not critical, although it is generally desirable to present a relatively large top surface of the wafer since heat is radiated from this surface towards the heat detector under test. On the other hand, the thickness of the wafer does not need to be great. The overall size of each wafer is preferably sufficient to support four to six heat generating wettings of about a teaspoonful each. For purposes of the present invention, a suitable rectangular wafer size is approximately 2.5 inches by 1.5 inches by 3/16ths inch.

According to the method of this invention, a heating wafer 50 is placed in the cup, and a teaspoonful of water is poured onto the top surface of the wafer. This small amount of water is largely absorbed by the porous wafer material and little if any will be left free to spill from the holder cup. It is presently preferred to provide a wrapper 54 of tissue paper or other absorbent sheet material over the wafer 50, as shown in FIG. 3, to assist in retention and more even distribution of water over the wafer surface.

Figure 4:
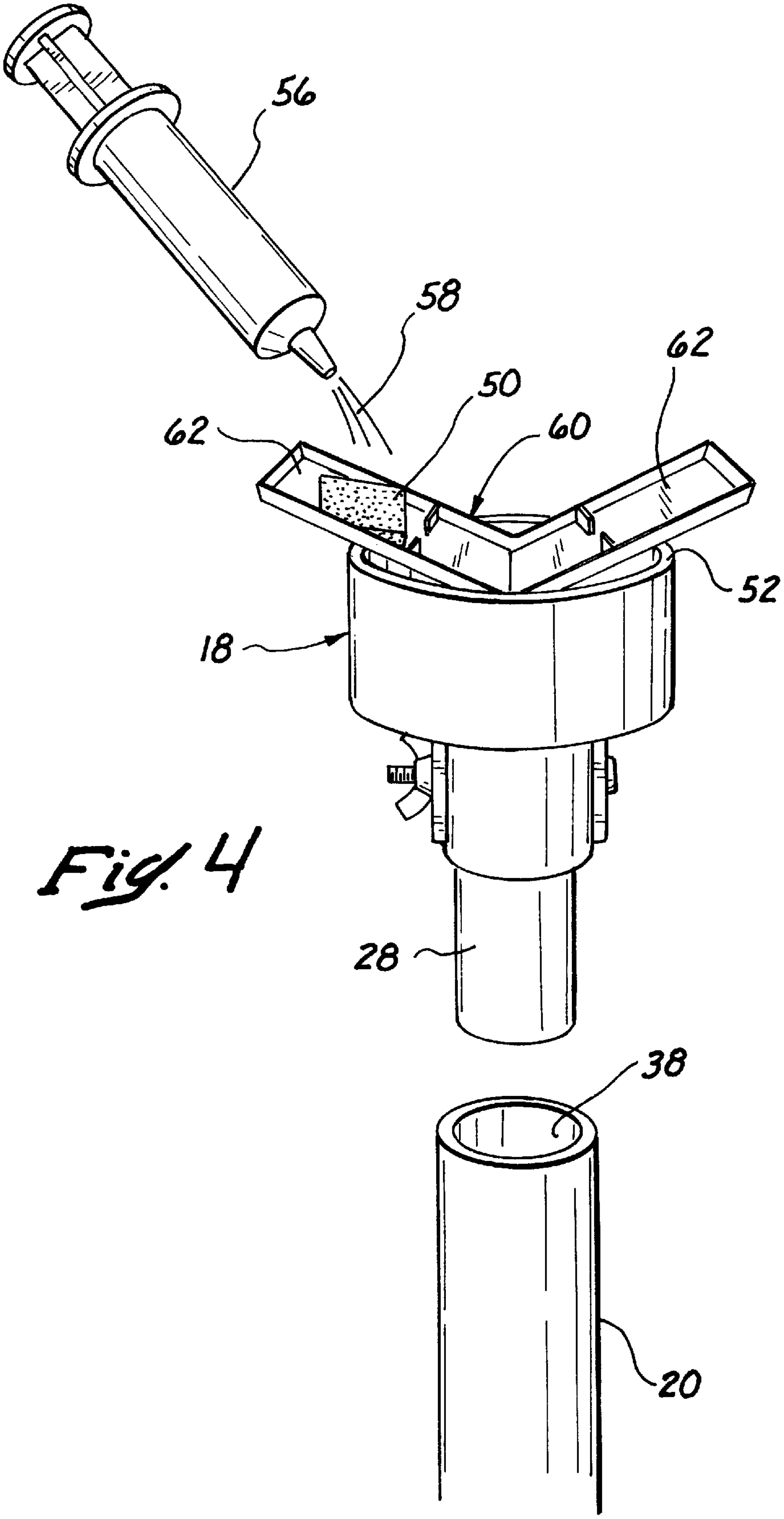
FIG. 4 shows an adapter tray installed on a cup holder, and a wafer on the tray being activated by addition of water dispensed from a syringe.

The activating water 58 may be conveniently dispensed onto the wafer as shown in FIGS. 3 and 4 by means of a low cost, disposable plastic syringe 56 such as those used for oral irrigation in the dental profession. Such a syringe is conveniently carried by the operator P during the testing procedure and can hold a water supply sufficient for several wettings of the wafer 50, and if equipped with graduation on the syringe barrel allows the volume dispensed at each wetting to be measured for consistent wafer performance. The actual amount of water poured onto the wafer is not critical within relatively wide limits, so long as the top surface of the wafer is sufficiently wetted, and the amount of water needed for this purpose may be visually estimated if necessary. An excessive amount of water will generally result in a prolonged activation time of the wafer until all the water has reacted with the wafer composition. A grossly excessive amount of water, greater than can be reacted with the volume of the wafer, may result in generation of some steam and possibly in a somewhat reduced temperature of the activated wafer as some of the emitted heat is absorbed by the excess water.

The wafer 50 typically reaches operating temperature in about 30 seconds or less after wetting. Heating of the wafer may be verified by placing the palm of one hand over the cup, without touching the wafer. Once the heat wafer 50 is placed and activated in the holder 18, and after the exothermic composition has reached a sufficient operating temperature, the extension 20 is raised by the operator P, as shown in FIG. 1, to bring the hot wafer 50 in the holder 18 into close proximity to or contact with the heat detector 10 under test. Typically, the rim 52 of the open end of cup 18 can be placed against the underside of the heat detector 10, or against the ceiling 12 around the heat detector, as an aid to steadying the wafer 50 in position under the heat sensing element of the detector 10. Depending on the construction of the particular heat detector, the heat sensing portion 11 of the detector can be received in the cup 18 and brought into close proximity to or contact with the hot wafer 50, although actual contact is not essential to the proper testing of the detector 10. Close proximity of about one inch or less will normally suffice to set off the heat detector within a short time interval. A heat detector 10 with a rating of 190 degrees Fahrenheit or less will respond within a short time, typically a few seconds, to contact or close proximity of the hot wafer 50 to its sensing element 11. Proper operation of the detector 10 will be normally confirmed by actuation of an indicator lamp on a control panel of the fire alarm installation or by actual triggering of an audible alarm. If no such indication is obtained within an appropriate period of time, the heat detector 10 should be suspected of being defective, calling for closer inspection or replacement.

The operator P remains safely on the ground surface at all times during the testing procedure, and can move efficiently from one detector 10 to another without need for climbing up and down step ladders while pulling up electrical power cords connected to hot air blowers previously used for actuating heat detectors.

Figure 5:
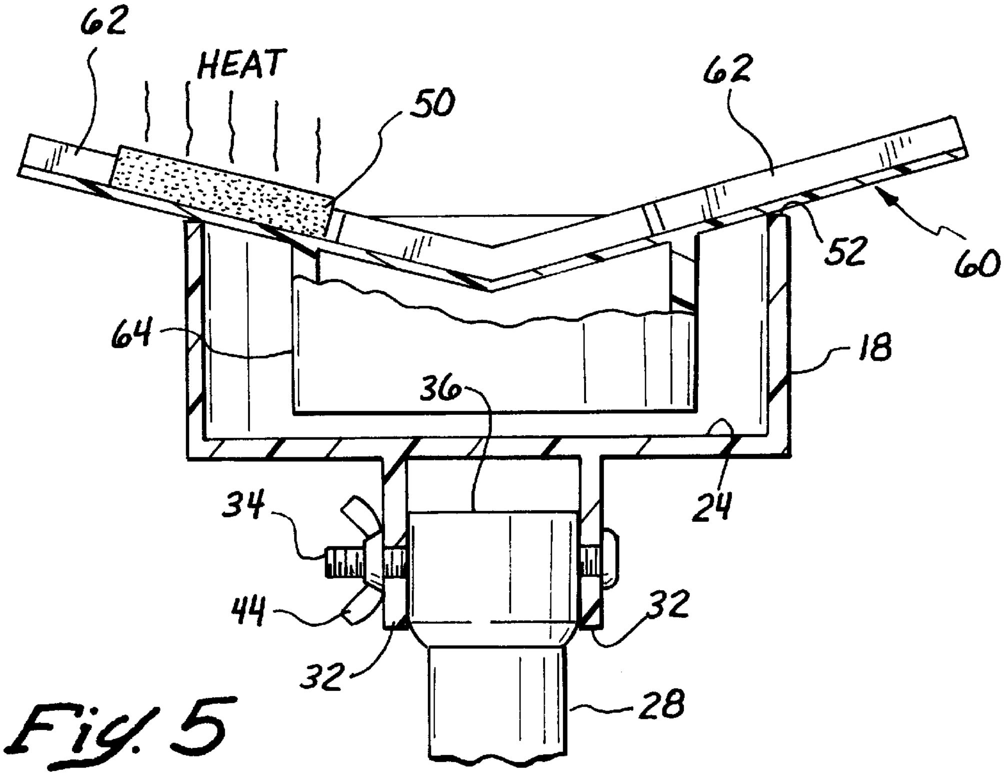
FIG. 5 is an elevational view partly in section showing the activated wafer on the adapter tray installed as in FIG. 4.

Testing of rate anticipation type heat detectors, which typically have a tubular housing extending vertically from the ceiling, is facilitated by the adapter tray 60 shown in FIGS. 4 and 5. The tray 60 has two generally planar holding pans 62 facing upwardly from the cup 18. The adapter tray has a walled underside 64 which is contained in the holding cup 18 and keeps the tray from sliding off the cup while being lifted and positioned against a heat detector 10. The bottoms of the pans 62 are each angled at about 135 degrees to each other and approximately 65 degrees to the longitudinal axis of the extension pole, each pan 62 rising at a shallow angle away from that axis as best understood from the elevational section in FIG. 5. A heat wafer 50 is placed in at least one of the holding pans 62 and activated by wetting as described above. The adapter tray 60 is raised towards the heat detector 10 and the extension pole is inclined by the operator on the ground such that the holding pan containing the hot wafer lies approximately vertically and against the side of the vertical tube of the heat detector.

When testing low profile type heat detectors or combination smoke/heat detectors, it is recommended that a heat wafer 50 be placed and activated in each holding pan 62 of the adapter tray, and the adapter tray be elevated while mounted on the holding cup 18 to bring a hot wafer into contact, or as close thereto as possible, with the sensing element of the heat detector 10. This procedure is used because these types of detectors have a shallow housing which will not normally extend into the holding cup 18 and into sufficient proximity to a hot wafer which is merely placed in the bottom of the cup.

When testing heat detectors rated at 190 degrees Fahrenheit it may be helpful to use two heat wafers 50 stacked one on the other in the holder cup 18. In such case, the bottom wafer is wetted prior to placing the second wafer over it, and then the second wafer is wetted, each with a teaspoonful of water. The two stacked wafer can generate more heat than a single wafer to expedite activation of the higher temperature rated detectors. However, it has been found that a single activated heat wafer 50 suffices to actuate a 190 degree F rated heat detector.

It will be appreciated that the adapter tray 60 could be eliminated by replacing the cup 18 with a different holder configured so as to better expose the hot wafer or wafers 50 at the upper end of the extension pole. For example, the adapter tray or an equivalent structure could be affixed directly to the top end of the extension pole 20. For this reason, it will be understood that this invention is not limited to any particular holder or application device for the supercorrosive alloy heat wafers 50.

Heating wafers 50 containing exothermic compositions of supercorrosive alloys are well suited for the testing of heat detectors as compared to most any other source of heat. The heating wafers are small, lightweight, entirely self-contained and require no electrical power supply, whether via an extension cord or batteries. The exothermic reaction is started easily and reliably by wetting the wafer, so that no open flame is needed nor generated at any time in the process. The maximum temperature reached by the exothermic composition is self-limiting at a level which is generally safe for the equipment being tested and unlikely to damage plastic housings or other components of the heat detectors even when brought into direct contact with the hot wafer. Each wetting of a heating wafer sustains a relatively steady operating temperature for a period of time generally sufficient for testing of one and possibly several heat detectors, depending on the ease of access to each unit and the efficiency of the operator. If many heat detectors are to be tested, or the detectors are far apart, a particular heat wafer 50 can be reactivated by re-wetting, accomplished by the addition of another teaspoonful of water. A single wafer of the size preferred for use in this invention can be usually reactivated in this manner four or more times, allowing the operator to reach distant detectors before each reactivation, in effect stretching the heating time and usefulness of the wafer and avoiding the inconvenience of more frequent replacement of the wafer 50 in the holder cup 18.

The heat wafers 50 are inexpensive, and the cost of the wafers needed for testing any particular installation is almost negligible in a commercial context. The used heat wafers are ecologically benign, and can be safely discarded without hazard to humans or the environment. The unused heat wafers have a shelf life of several years, and require no special storage considerations so long as they are not wetted or provided they are packaged in water tight bags or containers.

This application for water activated exothermic compositions has not been previously envisioned by others, yet it provides a simple, safe and low cost solution to the problem of testing higher temperature heat detectors. The water activated exothermic compositions can replace the air activated exothermic compositions of U.S Pat. No. 5,611,620 in that the low temperature and ordinary range heat detectors can be also tested by the present method, while extending the range of heat detectors susceptible to safe and convenient testing with exothermic compositions. The result is that a substantially greater proportion of the installed heat detector population can be tested by this method.

It should be understood that a preferred embodiment has been described and illustrated for purposes of clarity and example only, and that various changes, modifications and substitutions can be made thereto without departing from the spirit and scope of the present invention as defined in the following claims.

What is claimed is:

1. A method for testing a heat detector having a heat sensor and mounted at an elevated location above a ground surface, comprising the steps of:

providing a composition formulated to react exothermically but non-flammably and to release steam upon being wetted so as to sustain a temperature sufficient to activate the heat detector under test;

wetting said composition to initiate an exothermic reaction; and elevating said composition into contact with or sufficient proximity to an underside of said heat detector to expose said heat sensor to heat and steam produced by the exothermic reaction without intervening heat insulation and steam barriers between said composition and said heat detector thereby to permit both heat and steam rising from said composition to reach the heat sensor of the detector such that heat is more effectively delivered to the heat sensor by contact thereof with steam from the exothermic reaction.

2. The method of claim 1 wherein said step of elevating comprises the steps of:

providing a substantially rigid extension having a handle end and a holder at an opposite end;

placing said composition in said holder; and raising said extension to bring said holder with said composition into close proximity to the heat detector while standing on the ground surface under the heat detector.

3. The method of claim 1 wherein said composition is in the form of a solid wafer.

4. The method of claim 1 wherein said step of wetting comprises the step of dispensing water by means of a syringe onto said composition.

5. The method of claim 1 wherein said composition comprises an alloy of an active metal and an inactive metal selected to react exothermically with an electrolyte.

6. The method of claim 5 wherein said active metal is magnesium and said inactive metal is iron.

7. The method of claim 5 wherein said composition comprises dry salt soluble during said wetting for producing said electrolyte.

8. The method of claim 5 wherein said alloy is formed together with a thermoplastic material to make a porous wafer.

9. The method of claim 1 wherein said exothermic composition is formulated to sustain a temperature of at least approximately 195 degrees Fahrenheit.

10. The method of claim 1 further comprising the step of providing a wrapper of water absorbent tissue paper over said composition to assist in even retention and distribution of water over the composition.

11. A method for testing a heat detector having a heat sensor and mounted at an elevated location above a ground surface, comprising:

providing a supercorroding metal alloy composition formulated to react exothermically but non-flammably upon being wetted and to release steam at a temperature sufficient to activate the heat detector under test for a period of at least a few minutes;

providing an extension having a handle end and a holder for receiving said composition at an opposite end, said extension being of sufficient length for reaching the heat detector while being held by an operator standing on the ground surface under the detector;

placing said composition in said holder;

wetting said composition to initiate the exothermic reaction; and raising said extension to bring said holder with said composition into sufficient proximity to or contact with an underside of said heat detector to expose said heat sensor to heat and steam produced by said exothermic reaction without intervening heat insulation and steam barriers, such that heat is more effectively delivered to the heat sensor by contact thereof with steam from the exothermic reaction.

12. The method of claim 11 wherein said wetting is done by adding a liquid by means of a syringe.

13. The method of claim 12 wherein said composition comprises dry salt and said liquid is water.

* * * * *